(12) United States Patent
Vogel et al.

(10) Patent No.: US 8,593,411 B2
(45) Date of Patent: Nov. 26, 2013

(54) FLEXIBLE-USE DISPLAY AND CONTROL ELEMENT PANEL FOR CONTROLLING CABIN FUNCTIONS

(75) Inventors: Carsten Vogel, Hamburg (DE); Stefan Schulz, Himmelpforten (DE)

(73) Assignee: Airbus Operations GmbH (DE)

( * ) Notice: Subject to any disclaimer, the term of this patent is extended or adjusted under 35 U.S.C. 154(b) by 464 days.

(21) Appl. No.: 12/510,381

(22) Filed: Jul. 28, 2009

(65) Prior Publication Data

US 2010/0020038 A1  Jan. 28, 2010

Related U.S. Application Data

(60) Provisional application No. 61/137,170, filed on Jul. 28, 2008.

(30) Foreign Application Priority Data

Jul. 28, 2008 (DE) .......................... 10 2008 035 090

(51) Int. Cl.
*G06F 3/041* (2006.01)

(52) U.S. Cl.
USPC ............. 345/173; 345/87; 345/204; 345/211; 345/810; 715/701; 715/771; 715/810; 715/758

(58) Field of Classification Search
USPC ................... 345/156–179, 204, 810, 211, 87; 178/18.01–18.06; 725/74–77; 715/701, 715/771, 758, 810
See application file for complete search history.

(56) References Cited

U.S. PATENT DOCUMENTS

| | | | |
|---|---|---|---|
| 6,253,190 B1 * | 6/2001 | Sutherland | 705/20 |
| 2003/0160706 A1 | 8/2003 | Endress et al. | |
| 2003/0184528 A1 | 10/2003 | Kawasaki et al. | |
| 2004/0145612 A1 * | 7/2004 | Kopitzke et al. | 345/810 |
| 2006/0290526 A1 * | 12/2006 | Golson | 340/641 |
| 2008/0072163 A1 * | 3/2008 | Teng et al. | 715/761 |
| 2008/0141315 A1 * | 6/2008 | Ogilvie | 725/77 |
| 2008/0247128 A1 * | 10/2008 | Khoo | 361/681 |
| 2009/0153491 A1 * | 6/2009 | Moosavi | 345/172 |

FOREIGN PATENT DOCUMENTS

| | | |
|---|---|---|
| DE | 10103335 A1 | 8/2002 |
| DE | 10207641 A1 | 9/2003 |
| DE | 20311134 U1 | 9/2003 |
| DE | 10329188 A1 | 1/2005 |
| DE | 102007053677 A1 | 6/2008 |
| DE | 102007019685 A1 | 10/2008 |
| EP | 0707257 A1 | 4/1996 |
| EP | 1617397 A2 | 1/2006 |
| EP | 1739526 A1 | 1/2007 |

* cited by examiner

*Primary Examiner* — Joe H Cheng
*Assistant Examiner* — MD Saiful A Siddiqui
(74) *Attorney, Agent, or Firm* — Lerner, David, Littenberg, Krumholz & Mentlik, LLP

(57) ABSTRACT

A display- and control element panel for controlling cabin functions in an aircraft, comprising a bi-stable display element and a control elements wherein the bi-stable display element and the control element are arranged so as to be essentially congruent, wherein the bi-stable display element is adapted to reproduce information at least in one sub-region, and wherein an event is triggerable by activating the control element.

15 Claims, 6 Drawing Sheets

FLEXIBLE-USE DISPLAY AND CONTROL ELEMENT PANEL FOR CONTROLLING CABIN FUNCTIONS

CROSS-REFERENCE TO RELATED APPLICATIONS

This application claims the benefit of the filing date of U.S. Provisional Patent Application No. 61/137,170 filed Jul. 28, 2008, the disclosure of which is hereby incorporated herein by reference.

BACKGROUND OF THE INVENTION

The invention relates to a display- and control element panel for controlling cabin functions in an aircraft; to an aircraft with a display- and control element panel for controlling cabin functions according to the present invention; and to the use of a display- and control element panel for controlling cabin functions in an aircraft.

Conventional display- and control element panels for controlling cabin functions in an aircraft make it possible for a user, for example a member of the cabin crew, to control various cabin functions, for example the light intensity or the temperature. It is also imaginable for an announcement to be initiated, or for the volume of said announcement to be set.

However, most of the time conventional display- and control element panels for controlling cabin functions in an aircraft are designed so as to be aircraft-specific and, moreover, also airline-specific, in other words to a large extent individualised to the respective location of application.

Conventional display- and control element panels for controlling cabin functions in an aircraft thus provide very limited functionality, moreover comprise little flexibility in use, and require a large extent of individualisation. A quick change in the functions, or an exchange in the case of a fault occurring, may require very considerable service effort or logistics effort.

BRIEF SUMMARY OF THE INVENTION

It is an object of the present invention to provide a user-friendly, safe, and flexible-use display- and control element panel for controlling cabin functions in an aircraft.

Accordingly, a display- and control element panel for controlling cabin functions in an aircraft; an aircraft comprising a display- and control element panel for controlling cabin functions; and the use of a display- and control element panel for controlling cabin functions in an aircraft according to the independent claims are provided.

According to an exemplary embodiment of the present invention, a display- and control element panel for controlling cabin functions in an aircraft is provided, comprising a bi-stable display element and a control element, wherein the bi-stable display element and the control element are arranged so as to be essentially congruent, wherein the bi-stable display element is equipped to reproduce information at least in one sub-region, and wherein an event is triggerable by activating the control element.

According to a further exemplary embodiment of the present invention, a display- and control element panel for controlling cabin functions in an aircraft is provided, comprising a bi-stable display element and a control element, wherein the bi-stable display element and the control element are arranged so as to be essentially congruent, wherein the bi-stable display element is equipped to reproduce information at least in one sub-region, wherein an event is triggerable by activating the control element, wherein the display- and control element panel (20) is decouplable from at least one element from the group consisting of a display-control element (6), image-rendering element (8) and energy supply element, associated with the display- and control element panel (20) and wherein the display- and control element panel (20) is operable in the operating state in the aircraft without the at least one element.

According to a further exemplary embodiment of the present invention, an aircraft is provided comprising a display- and control element panel for controlling cabin functions according to the present invention.

According to a further exemplary embodiment of the present invention, a display- and control element panel according to the present invention is used for controlling cabin functions in an aircraft.

A display- and control element panel for controlling cabin functions in an aircraft, according to the present invention, may be understood as a control panel for systems in the aircraft.

In this arrangement a combination of a display element, in particular of a bi-stable display element as an example of a display element, may be used in combination with a control element.

The control element may be a keypad or a touch-sensitive panel or a touch-sensitive area, which panel or area may be arranged in front of or behind the display element.

A display- and control element panel according to the present invention may thus no longer mandatorily be prefabricated and individualised to a large extent. A prefabricated display element, for example a printed display element, that reproduces the functions of a control element panel, may now no longer have to be kept in stock in all its possible equipment variants.

Instead of the above, any exchange may be able to be implemented at short notice with a universal display element, for example with a bi-stable display element, and with individualisation of the information displayed.

Cumbersome and cost-intensive keeping in stock of a host of different displays, each individualised in relation to the corresponding desires, specifications and individualisations of a particular aircraft type or of a particular airline, may thus be effectively stopped or at least reduced. At best, individualisation of the bi-stable display element may take place locally, for example in the aircraft.

The term "bi-stable display element" may refer to a display element that visibly preserves information to be displayed, even after an energy supply has been withdrawn. The energy supply may thus only be used for "programming" the bi-stable display element, in other words at the point in time of placing, setting (or deleting) the information to be presented, e.g. text information or graphics.

After the information to be presented has been reproduced by the display element, the energy supply may be withdrawn; however, the display element may nevertheless continue to show the information to be presented.

An energy supply device may thus be required only for changing the information to be presented. It may thus not be necessary to supply energy to the display element during the actual presentation of the information.

Bi-stable displays may be implemented with the use of various techniques. Possible techniques include bi-stable liquid-crystal displays, electrophoretic displays (for example the electronic paper produced by the company named eInk), electrochromic displays or displays that are based on a cholesteric effect.

Bi-stable display elements may have a lower energy consumption than other types of displays, for example LCD or TFT displays.

Furthermore, bi-stable display elements may meet more stringent safety requirements, particularly in an aircraft environment, because bi-stable display elements continue to show the desired or required information to be shown, even when there is no supply of energy, for example in the case of a partial or complete failure of the energy supply in an aircraft.

Expensive electronics for controlling and for providing the supply of energy, which electronics may possibly be required in a conventional display element, may thus be superfluous in the case of implementation of a bi-stable display element. In this way the costs of the electronic system of an aircraft, and thus the entire energy requirement, as well as the weight of the aircraft, may be further reduced.

Furthermore, bi-stable display elements may be individualised in a simple and cost-effective manner externally, in other words outside an aircraft. Bi-stable display elements may thus be kept in stock, for example, as (universal) spare parts and may be dispatched in a targeted manner and individualised to customer requirements. This effectively avoids any cumbersome and cost-intensive production and keeping in stock of a multitude of display elements that may possibly differ only slightly from each other.

A bi-stable display element may visually reproduce information. This may, for example, relate to marking a control element by graphics, text or the like. A bi-stable display element may continue to show the information to be presented, even after the energy supply has been interrupted. In particular, the bi-stable display element may be connected to an energy supply exclusively during programming of said bi-stable display element.

Thus the energy consumption of a display- and control element panel according to the present invention may result in reduced energy consumption for controlling cabin functions, or such a display- and control element panel may likewise be used when at a particular location in the aircraft there is no energy available for supply to said display element.

Bi-stable display elements may comprise greater mechanical, thermal and electrical stability than LCD or TFT display elements.

On the one hand the control element may be implemented as a discrete control element. Thus a control element may be associated with a separate triggerable event or on the other hand the control element may be a logical control element which, for example, may also detect or evaluate the type and the extent (e.g. intensity and location) of control, and thus with the use of additional information, for example location and type of the information displayed (at the time), on the bi-stable display element may associate an event that is to be triggered.

Furthermore, the use of a discrete control element may provide individual functions or keys directly, i.e. discretely, as may be required by particular safety limitations or safety requirements.

If a logical control element is used, the size of the control element(s) may be individually or dynamically configurable.

A combination of discrete and logical control elements may also be imaginable.

Furthermore, a differentiation between two principal application types may be made.

The display- and control element panel according to the present invention may be used in an environment that is essentially without an energy supply; in other words an energy supply may not be required for regular operations namely the control of cabin functions.

The bi-stable display element may thus have been programmed at a particular point in time in such a way to present the desired information at the desired location. Subsequently the bi-stable display element may be decoupled from a programming element, an energy supply, a display-control element and/or an image-rendering element.

The bi-stable display element may thus show the desired information even after decoupling.

This may make it possible to program a bi-stable display element according to the present invention as a spare part distant from the planned location of use, in the present case for example the aircraft cabin, so that it shows the desired information.

Thus a bi-stable display element according to the present invention may, for example, be programmed as required as a spare part in a spare parts stockroom, in order to subsequently send this display element away, possibly over long distances. Furthermore, in this way it may no longer be necessary to keep in stock possibly many different types of display elements with individual marking for those cases where a defect arises.

Furthermore, programming of the bi-stable display element according to the present invention may take place at a central position in the aircraft, in order to be conveyed from there to the respective location of use.

The display- and control element panel may thus be able to be operated also in the operating state in the aircraft without a display-control element, image-rendering element and/or energy supply element.

In particular, the display- and control element panel may be operated in an operating state, the regular operating state, of an aircraft, e.g. during boarding, deplaning or in-flight, without, e.g. disconnected or separated from, an energy supply element. Thus, at least the display element of the display- and control element panel may be operated without supplying power to the display element.

As a second possible scenario, individual dynamic programming of the bi-stable display element according to the present invention or of the display- and control element panel according to the present invention is imaginable.

With the use of dynamic programming in the aircraft it may thus be imaginable to present first information during a first operating state, while second information, which at least in part may differ from the first information, may be presentable in a second operating state.

The information to be presented may thus be dynamically adaptable to various requirements of different control situations for cabin functions.

Thus, at a first point in time, for example while the aircraft is located at the gate of an airport, in particular for example during the boarding procedure, completely different control functions are required by the cabin crew than may be the case, for example, during flight.

Further exemplary embodiments of the present invention are stated in the dependent claims.

Below, embodiments of the display- and control element panel for controlling cabin functions in an aircraft according to the present invention are described. However, these embodiments also apply to the aircraft, comprising a display- and control element panel for controlling cabin functions, and to the use of a display- and control element panel for controlling cabin functions in an aircraft.

According to a further exemplary embodiment of the present invention, the control element may be provided so as to be essentially transparent.

According to a further preferred embodiment of the present invention, the bi-stable display element may essentially be arranged behind the control element.

By means of the transparent design of the control element it may among other things be possible to arrange the bi-stable display element behind the control element. In this way considerably more direct interaction with the control element may be possible.

At the same time the bi-stable display element may be better protected from external effects, for example mechanical or thermal effects.

The bi-stable display element may thus also be completely mechanically protected or decoupled from the control element. In this arrangement, the transparent design of the control element may be helpful to read the bi-stable display element, or the information shown thereon, which display element is arranged behind the control element.

According to a further preferred embodiment of the present invention, the control element may essentially be arranged behind the bi-stable display element.

By means of a corresponding arrangement, point-force application onto the control element may effectively be stopped. Instead, the force applied may be able to be evenly transferred to the control element at least in a sub-region. Widening of the control impingement is thus implemented.

By arranging the bi-stable display element in front of the control element, access to, or exchange of, the display element may easily be possible in the case of a defect or in the case of reprogramming.

Furthermore, behind a display element the control element may be better protected from mechanical, thermal or electrical influences.

According to a further preferred embodiment of the present invention, the display- and control element panel may comprise a plurality of control elements and/or bi-stable display elements.

In this arrangement several control elements may be able to be combined with at least one bi-stable display element; or several bi-stable display elements may be able to be combined with at least one control element.

A corresponding arrangement may comprise a geometrically regular pattern, for example three columns of five rows each, or four columns of six rows each; however, any desired arrangement can be implemented, even if the distribution is not symmetrical.

Individual control elements and/or bi-stable display elements may differ in size from others. Control elements with important functions, for example safety-relevant functions, may assume a prominent position.

According to a further embodiment of the present invention, the control element may be an element from the group comprising a discrete control element, key button, switch, pressure-sensitive region, wherein the position of activation is determinable, and a touchpad.

Corresponding control elements or components may make it possible to implement a control element in a simple and cost-effective manner.

Discrete control element may also relate to a discrete pressure-sensitive region or to a touchpad. The pressure-sensitive region may be able to determine the position of activation; however, said pressure-sensitive region may also not determine this information or may discard it. Furthermore, it may be imaginable to determine the intensity of activation, and thus the impingement of force when the control element is activated. A control element may likewise provide tactile feedback relating to control or relating to the success of control.

According to a further exemplary embodiment of the present invention, each control element may be associated with a discrete bi-stable display element.

Thus, direct, logically simple and coherent allocation between a control element and a bi-stable display element may be provided.

In this arrangement the control element and the discrete bi-stable display element may form a unit; they may, for example, be arranged in the same housing, or they may be formed by simple overlay.

The bi-stable display element may be part of the control element, so that, for example in the case of a defect, the entire unit comprising the control element and the bi-stable display element may be replaced. For example, a corresponding control element may be designed as a key button or a switch, affixed in the activation region of the respective control element with a bi-stable display element.

According to a further embodiment of the present invention, the display- and control element panel according to the present invention may comprise at least one discrete control element with at least one discrete bi-stable display element as well as at least one touch-sensitive region with at least one bi-stable display element.

In this way a type of mixed operation between discrete control elements and a touch-sensitive region may be achieved. The touch-sensitive region itself may be divided into logical control elements with an associated bi-stable display element.

Thus, for example, important functions of aircraft control, for example safety-relevant functions, may be triggered by way of discrete control elements, which may possibly be less error-prone as a result of their discrete design when compared to logical control elements. Special safety requirements in the aircraft field may thus be implemented.

According to a further embodiment of the present invention, the display- and control element panel may further comprise a further display element, associated with at least one bi-stable display element.

In this arrangement a further display element may provide a state or expanded information relating to a bi-stable display element or relating to a discrete or logical control element. Thus it may, for example, be imaginable, by means of the further display element, to identify control elements that at the time are allowed, are not allowed or have no function.

In this context the term "associated" may be interpreted as belonging to a stable display element.

In this arrangement the further display element may be arranged in close proximity of the respective bi-stable display element, but it may also be arranged so as to be separate or removed, possibly at some altogether different location.

An arrangement in a recess, arranged at the respective bi-stable display element or behind the respective bi-stable display element and the associated control element, may be imaginable.

According to a further embodiment of the present invention, the further display element may be an LED element.

An LED element or light-emitting-diode element may be considered a simple option of implementing the function of a further display element.

In this arrangement the LED element may represent a different status of the control element or the bi-stable display element that is associated with it. For example, the colour red may signify that the respective control element cannot or must not be activated at that time. The colour green in turn may signify that activation is possible or allowed.

In each case a further colour may be imaginable for a further status, for example yellow, blue, orange or white.

Furthermore, the further display element may comprise a multitude of LED elements. Other types for the further display element may also be imaginable. For example, the further display element itself may be designed as a bi-stable display element.

According to a further embodiment of the present invention, the display- and control element panel may furthermore comprise an illumination element for at least partial illumination of at least one bi-stable display element and/or of a further display element.

In this way simple, easy-to-implement, and economical illumination of the display- and control element panel according to the present invention may be possible. By means of an illumination element, operation may also take place when the light is bad or in complete darkness.

The illumination element may be an element that is actively to be operated, for example an incandescent bulb, a fluorescent tube or an LED element. Likewise, the illumination element may be based on a phosphorescent or fluorescent effect. The illumination element may also be associated with a discrete and/or logical control element or bi-stable display element, or may be integrated so as to be connected with said discrete and/or logical control element or bi-stable display element.

According to a further embodiment of the present invention, the display- and control element panel may further comprise at least one element from the group consisting of a display-control element, image-rendering element, control element—controlling element and an interface element.

In this arrangement the individual elements may be discretely implemented or, at least some, may be designed to be integrated. A corresponding element may in each case comprise at least some of the following components: a memory, programmable memory, RAM, ROM, programmable element and a microprocessor.

The respective functionality may be implemented by hardware; or software-based implementation, for example by means of programming a microprocessor, may be imaginable.

In this arrangement the image-rendering element may itself provide the information to be presented, for example it may calculate or determine said information, and then forward it to the display-control element, by means of which said information is finally controlled or reproduced on the bi-stable display element. Preferably, the display-control element and the image-rendering—control element may form a unit.

The control element—controlling element may ensure operation of a control element. The control element—controlling element may provide evaluation of controlling of a control element, for example as to which control element became active at what time, and as to the logical function that was associated with this control element at the given time.

Likewise, said control element—controlling element may determine, process and/or forward the type, position and control intensity of activation of a control element at a given time. Control of cabin functions may take place directly by way of the control element—controlling element Likewise, it may be imaginable for at least one of the following elements to be connected to an interface element: display-control element, image-rendering element, and control element—controlling element. The interface element may provide the interaction or communication of the display- and control element panel with further aircraft systems.

A corresponding interface element may make use of a known interface definition, for example RS 232 or CAN-BUS, or it may use a proprietary format.

Below, embodiments of the aircraft comprising a display- and control element panel for controlling cabin functions according to the present invention are provided. However, these embodiments apply both to the display- and control element panel and to the use of a display- and control element panel for controlling cabin functions.

According to a further embodiment of the present invention, an aircraft may further comprise an element from the group consisting of a display-control element, image-rendering element and energy supply element, associated with the display- and control element panel, wherein the display- and control element panel and the at least one element are decouplable.

In this context the term "decouplable" may refer to logical mechanical and/or electrical separation of the at least one element from the display- and control element panel.

In this arrangement the term "separation" may refer to the individual elements remaining in their positions; on the other hand it may also be imaginable if at least one of the decoupled elements is removed, in particular removed from the aircraft.

The display- and control element panel may thus be able to be operated also in the operating state in the aircraft without a display-control element, image-rendering element and/or energy supply element.

In particular, it may be imaginable for some or all of the following elements—namely display-control element, image-rendering element and energy supply element—to be arranged separately, and, for example, for them to be coupled to the display- and control element panel only for programming of the bi-stable display element, and for them to be removed or decoupled again after corresponding programming of the display element or of the information to be reproduced.

It may thus be imaginable with one device to successively program a plurality of display- and control element panels in an aircraft.

BRIEF DESCRIPTION OF THE DRAWINGS

Below, exemplary embodiments of the invention are shown in the figures and are explained in more detail. Identical or similar components in different figures have the same reference characters.

The illustrations in the figures are schematic and not to scale, however they may depict qualitative proportions.

Implementation of the invention is not limited to the embodiments shown in the figures. Instead, a multitude of variants are imaginable that make use of the solution presented and the inventive concept, even in the case of a basically different embodiment.

Figure 1A:
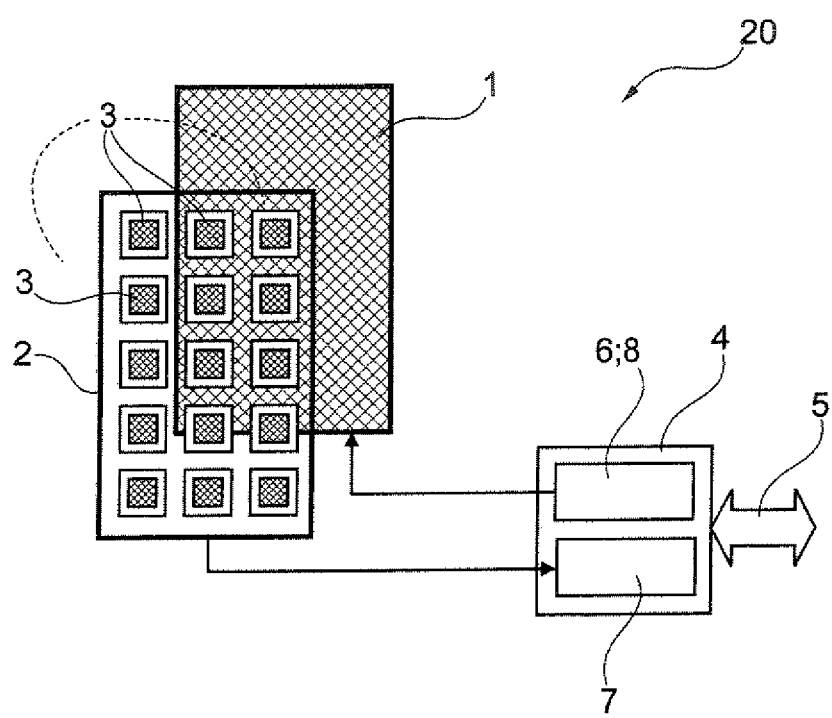
Figure 2A:
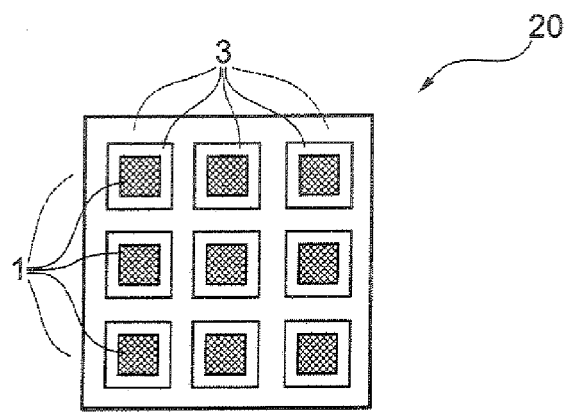
Figure 2B:
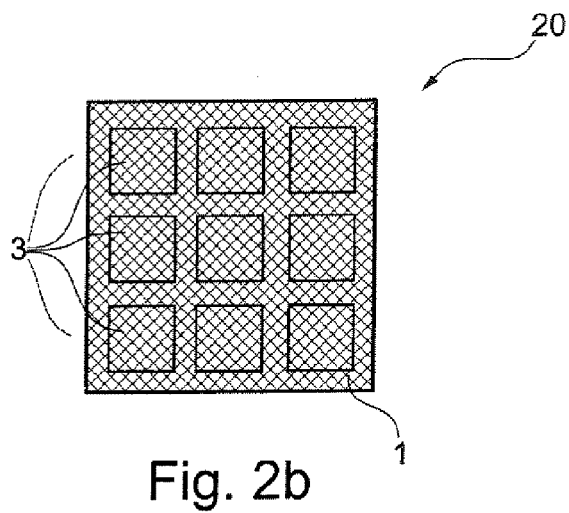
Figure 2C:
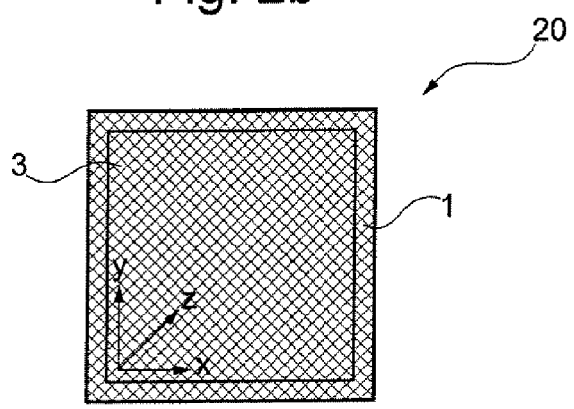
Figure 3:
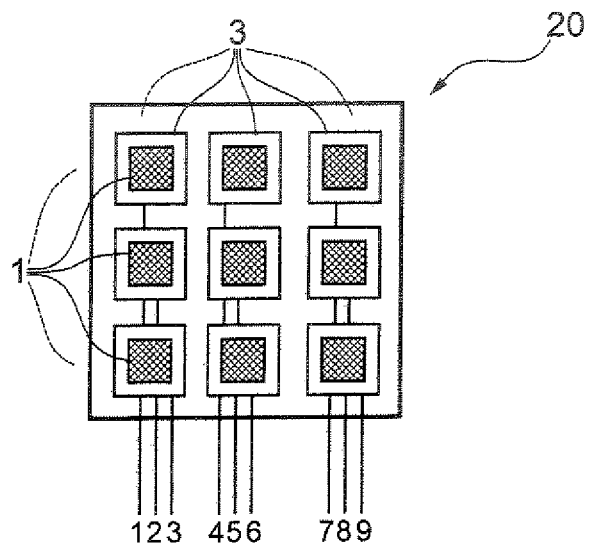
Figure 4:
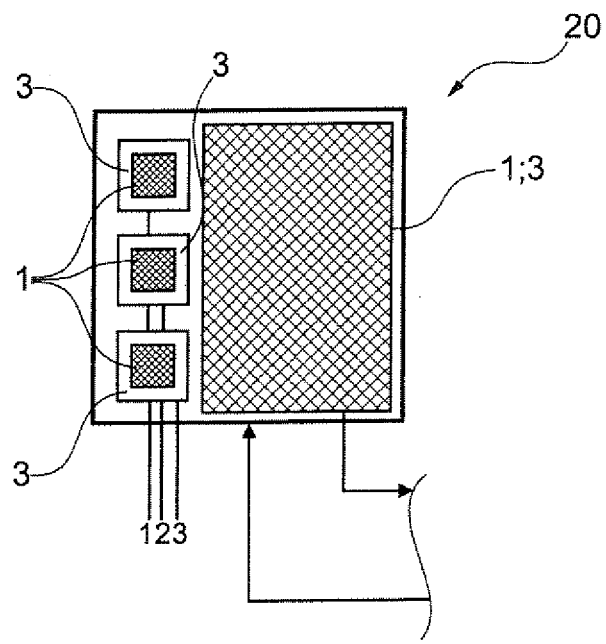
Figure 5:
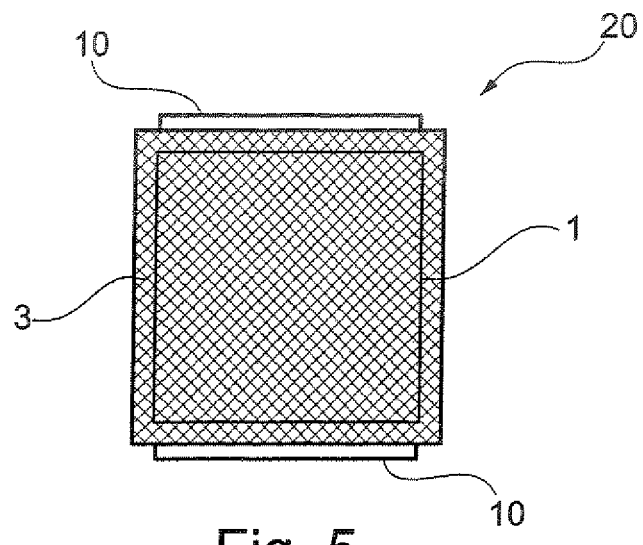
Figure 6A:
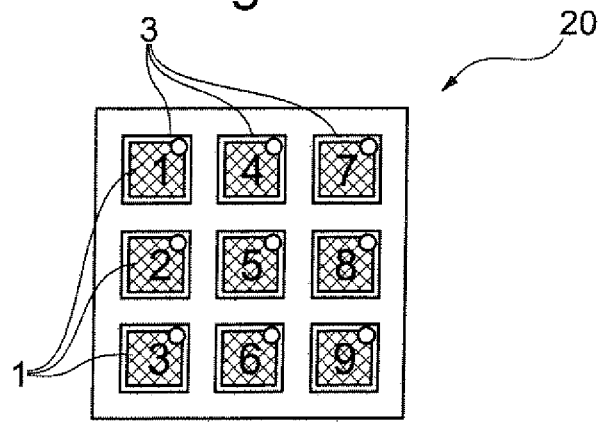
Figure 6B:
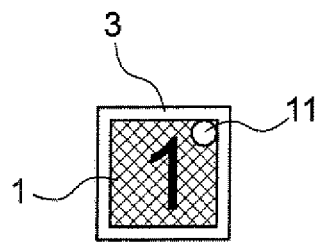
Figure 7:
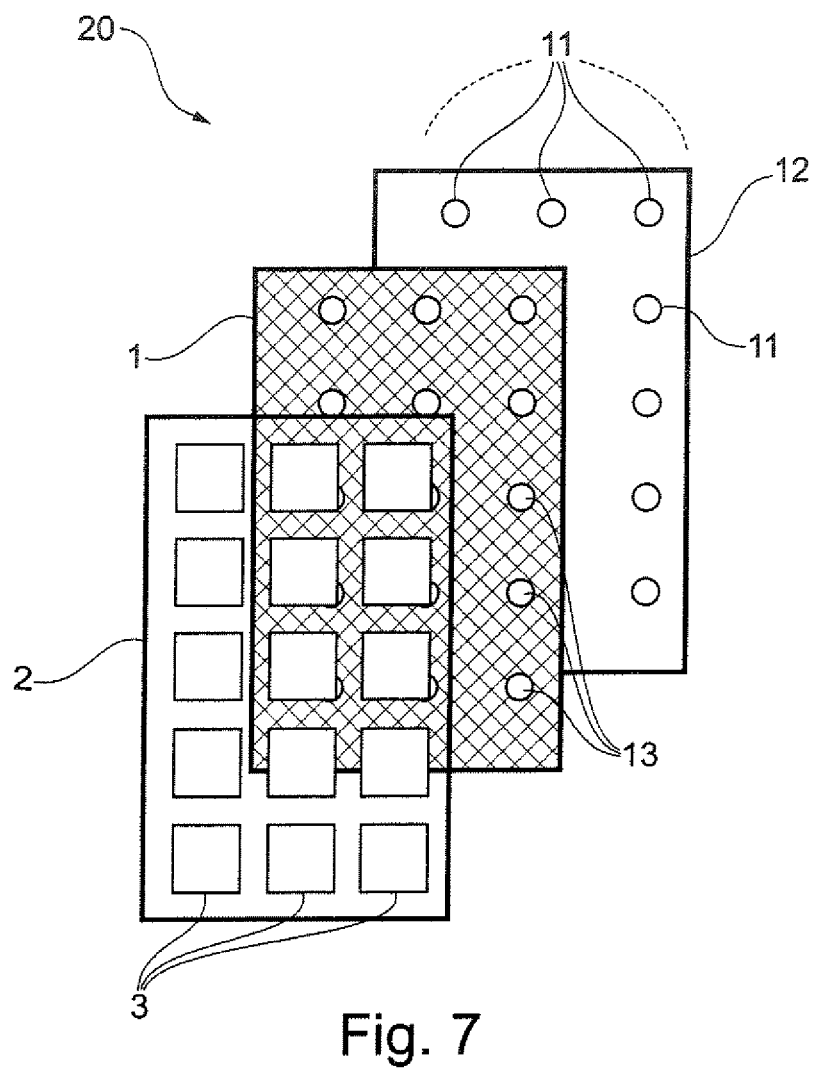

The following are shown:

FIGS. 1a, b arrangement options of exemplary embodiments of a display- and control element panel of the present invention, FIGS. 2a to c further exemplary embodiments of a display- and control element panel of the present invention, FIG. 3 an exemplary embodiment of a display- and control element panel of the present invention with discrete control elements, FIG. 4 an exemplary embodiment of a display- and control element panel of the present invention both with discrete control elements and with a pressure-sensitive region, FIG. 5 an exemplary embodiment of a display- and control element panel of the present invention with an illumination element, FIGS. 6*a*, *b* an exemplary embodiment of a display- and control element panel of the present invention with a further display element, FIG. 7 an exemplary embodiment of a display- and control element panel of the present invention with an LED element arrangement.

DETAILED DESCRIPTION

Below, with reference to FIGS. 1*a* and *b*, arrangement options of exemplary embodiments of a display- and control element panel of the present invention are described.

FIG. 1*a* shows a bi-stable display element 1 that is arranged behind a control element arrangement 2. The control element arrangement 2 comprises several control elements 3, in the present case as an example 15. The control elements 3 in FIG. 1*a* are shown, as an example, as discrete control elements 3. The control element arrangement 2 is coupled with the control element controlling element 7 of the electronic element 4. In this arrangement, coupling is shown diagrammatically only, by means of an arrow.

The bi-stable display element 1, also shown diagrammatically only, is coupled to a combined display-control element 6 and image-rendering element 8 of the electronics element 4. In the case of FIG. 1*a* the electronics element 4 comprises the accumulation of elements 6, 7 and 8.

However, it may also be imaginable for these elements to be provided discretely, or for their functionalities to be subsumed in, for example, a microprocessor-controlled system. Further elements may also form part of the electronic element 4, for example a power supply element (not shown) or an interface element 5.

The couplings between the electronics element 4 and the bi-stable display element 1 as well as the control element arrangement 2 are shown separately in FIG. 1*a*. Likewise, however, a combined connection may be imaginable. This connection may be wired discretely, in other words individually, or it may be established by way of a bus connection.

Likewise, an evaluation unit for control element functions may be included in the control element arrangement 2, not shown in FIG. 1*a*. The electronics element 4 with the elements 6 to 8 may be arranged in spatial proximity to at least one of the following elements: bi-stable display element 1 and control element arrangement 2 with control elements 3.

It is also imaginable to arrange the electronics element 4 centrally in an aircraft, or, for example, due to the special functionality of the display- and control element panel 20 according to the present invention, to do completely away with the electronics element 4.

Likewise, direct interface coupling with the interface element 5 to the bi-stable display element 1 as well as control element arrangement 2 with control elements 3 may be imaginable.

In FIG. 1*a* the bi-stable display element 1 is arranged behind the control element arrangement 2. The control element arrangement 2 as well as the individual control elements 3 are provided so as to be essentially transparent, thud optically penetrable. The bi-stable display element 1 may thus be protected, by the control element arrangement 2, for example against thermal, mechanical and/or electrical influences. Operation of the individual control elements 3 may take place directly by direct activation of the control elements 3.

Figure 1B:
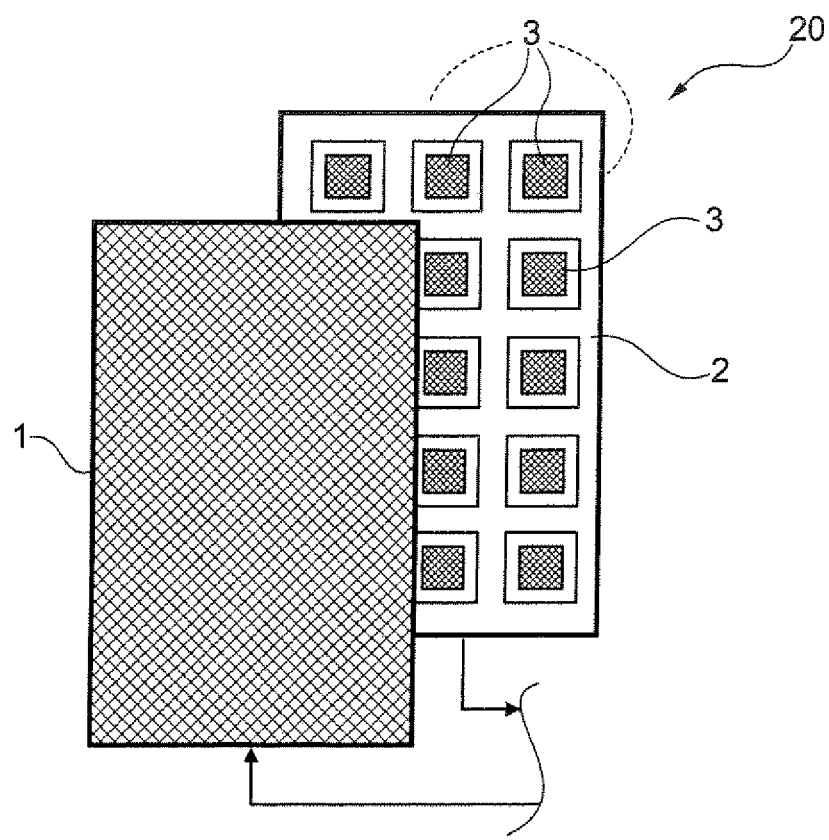

FIG. 1*b* shows the display- and control element panel 20 according to the present invention, wherein in the present embodiment the bi-stable display element 1 is arranged in front of the control element arrangement 2 with the control elements 3. Apart from this, wiring or controlling is identical to that in FIG. 1*a*.

By means of arranging the bi-stable display element 1 in front of the control element arrangement 2, direct optical access to the information of the bi-stable display element 1 is possible. Furthermore, it may not be necessary to design the control element arrangement 2 and/or the control elements 3 so that they are essentially transparent.

The bi-stable display element 1 may be provided with mechanical support by the control element arrangement 2. At the same time, the force acting on the control elements 3, when said control elements 3 are activated, may be distributed more evenly. It is thus possible to prevent the occurrence of point-force overload of the control elements 3.

Furthermore, referring to FIGS. 2*a* to *c,* further exemplary embodiments of a display- and control element panel of the present invention are described.

In the figures below, exclusively exemplary embodiments of the display- and control element panel 20 are discussed. Further mechanical or electrical coupling may be understood to be described in a way that is analogous to that of FIG. 1*a*. Explicit embodiments of the coupling or wiring arrangement are known to the average person skilled in the art, and are not shown unless explicitly indicated.

FIG. 2*a* shows, as an example, nine discrete control elements 3, each comprising an associated bi-stable display element 1. Any other arrangement, for example three times five, or five times eight, is imaginable.

The unit, shown in FIG. 2*a*, comprising a bi-stable display element 1 and a control element 3, may be a discrete component, for example a switch or a key button, with an integrated display element. In this arrangement the display elements 1 can comprise an essentially transparent cover, and can thus be protected against mechanical, electrical and/or thermal effects.

Likewise, the control elements 3 may be touch-sensitive control elements, for example touchpads with an integrated display element 1.

FIG. 2*b* shows an arrangement which, in the present case and as an example, shows nine control elements 3 as well as a bi-stable display element 1 which essentially covers the totality of the control elements 3.

In this arrangement the bi-stable display element may again be arranged in front of or behind the control elements.

In the arrangement shown in FIG. 2 it may, for example, be possible to show large-area information on the bi-stable display element 1, and at the same time, at least in some sections, to obtain discrete or continuous information relating to the operation of the control elements 3. The individual control elements 3 may be designed as binary control elements 3, comparable to switches or key buttons, or they may acquire, process and/or forward information relating to the type, extent, location and intensity of control.

FIG. 2*c* shows a bi-stable display element 1 as well as a control element 3. In this arrangement the bi-stable display element 1 may again be arranged in front of or behind the control element 3.

In the arrangement shown in FIG. 2*c*, the control element 3 may, in particular, be a pressure-sensitive region, for example a touchpad.

In this way it may be possible to obtain both qualitative and quantitative feedback relating to the type, extent, location and force or intensity of contact.

Likewise, operation of the control element 3 is imaginable in which a movement of a finger sliding essentially on the surface, i.e. a flowing movement, represents an operating process. In this way it would be possible, for example, to comfortably regulate or set, for example, the volume control of the PA system in an aircraft; or in this way dimming, i.e. setting the cabin interior illumination brighter or less bright, may easily be possible in a continuous manner.

A display- and control element panel 20, as shown in FIG. 2c, may set a total of three different parameters in one control procedure. For example, different parameters can be set in the x-direction and the y-direction, at the same time supplemented by the intensity, or the pressure, of operation. This may result in quasi "three-dimensional" operation. Operation in the x- or y-coordinates may represent a position on the surface, while the z-direction indicated in FIG. 2c may represent the intensity of operation.

Furthermore, referring to FIG. 3, an exemplary embodiment of a display- and control element panel of the present invention with discrete control elements is described.

FIG. 3 shows a display- and control element panel 20 which is essentially comparable to the one shown in FIG. 2a. The control elements 3 may discretely be designed as switches or key buttons, discrete control elements 3; in particular, as is the case in FIG. 2a, individual pressure-sensitive control elements 3, pressure-sensitive regions 3 may be used.

However, the individual control elements 3 of FIG. 3 are individually and discretely wired or connected; this is indicated by the nine data lines 1 to 9 of FIG. 3.

Thus a function or the use of the display- and control element panel 20 according to FIG. 3 may also be possible in a state of a power failure, or generally without a dedicated or connected energy supply.

Safety-relevant functions which must be available at all times, even in the case of a failure of the energy supply, may be implemented or wired in this way.

The control elements 3 of FIG. 3 further comprise a bi-stable display element 1 that may also be able to present information without an external energy supply.

Furthermore, referring to FIG. 4, an exemplary embodiment of a display- and control element panel of the present invention both with discrete control elements and with a pressure-sensitive region are described.

Essentially, the arrangement according to FIG. 4 could be regarded as a combination of FIG. 2c and FIG. 3. The three discrete control elements 3 of FIG. 4, which control elements 3 are shown as examples, are also discretely wired by way of individual data lines 1 to 3. As shown above in FIG. 1a, the pressure-sensitive region of the display- and control element 20 is, for example, connected to an electronics element 4. The discrete data lines may also be guided to the electronics element 4, where they undergo further processing.

An arrangement as shown in FIG. 4 may, in the pressure-sensitive region dynamically alternating, display situation-adapted information and provide functions, while at the same time, by way of the discrete control elements 3, special functions may be triggered, for example safety-relevant functions or emergency functions.

Furthermore, with reference to FIG. 5, an exemplary embodiment of a display and control element of the present invention with an illumination element is described.

In this arrangement, the display- and control element panel 20 shown in FIG. 5, as an example, essentially corresponds to that shown in FIG. 2c. In each case there is an illumination element 10, affixed laterally or at the top/bottom FIG. 5 shows the illumination element 10 as an essentially elongated element along a side of the display- and control element panel 20. Thus, large-area illumination of the display element and control element 20 is possible. In order to provide better illumination, the use of several illumination elements is possible, for example two illumination elements as shown in FIG. 5. A punctiform design of the illumination elements 10, or a design that at least in some sections is punctiform or elongated, is also imaginable.

The illumination element 10 may illuminate the display- and control element panel 20 directly (from above or from below), or it may illuminate the aforesaid indirectly by way of the background or from the front.

Furthermore it is imaginable, for example, to place an additional element onto, to or between the bi-stable display element 1 and the control element arrangement 2, which additional element with the use of an illumination element 10 illuminates the display- and control element panel 20 over a large area. The placed element itself may be the illumination element 10.

The illumination element 10 itself may, for example, be designed as an incandescent lamp, a fluorescent tube, or an arrangement comprising one or several LED elements.

Furthermore, referring to FIGS. 6a and b, an exemplary embodiment of a display- and control element panel of the present invention with a further display element is described.

The display- and control element panel 20, whose basic design is shown in FIG. 6a, as an example essentially corresponds to the panel shown in FIG. 2a.

In addition, each of the combined bi-stable display elements 1 and control elements 3 comprises a further display element 11. In the diagram, the further display element 11 is, as an example, shown as an LED element.

By means of the further display element 11, expanded information or status information relating to the respective control element 3 may be shown. For example, particular colouring of the further display element 11 may denote a control element 3 which, for example in the case of green, is currently able to be activated, while in the case of red it is currently not able to be activated, i.e. it is blocked or prohibited.

By means of a blinking display element the further display element 11 may draw attention, for example of a member of the crew of an aircraft, to itself and thus to the information contained on the bi-stable display element 1.

Other colours for other indications are imaginable. Moreover, it is not necessary for each control element 3 with a bi-stable display element 1 to comprise a further display element 11.

This may, for example, be necessary only in the case of particularly safety-relevant control elements 3, or in the case of information displayed on the bi-stable display element 1. Discrete control elements 3 that are separately connected or wired, as shown, for example, in FIGS. 3 or 4, may also comprise a further display element 11, as is the case, for example, with the control elements of FIGS. 2a to 2c.

Depending on the design of the further display element 11, it is likewise imaginable to use the second display element 11 also as an illumination element 10. In this arrangement a small region of the display- and control element panel 20 according to the present invention can be illuminated, or the entire field 20 may be illuminated.

Combined operation of an illumination element 10 and a further display element 11 in one element is imaginable. Thus, the further display element 11 may at least locally operate as an illumination element 10.

With further reference, in FIG. 7 an exemplary embodiment of a display- and control element panel of the present invention with an LED element arrangement is described.

FIG. 7 shows the known elements of the bi-stable display element 1 and of the control element arrangement 2 with control elements 3. The bi-stable display element 1 is arranged behind the preferably transparent control element arrangement 2. The control elements 3 may be designed as discrete control elements 3, but sheet-like pressure-sensitive regions or touchpads are also imaginable.

The bi-stable display element 1 comprises openings 13 which in turn correspond to the further display elements 11 of the LED element arrangement 12. In this arrangement the further display elements 11 are preferably provided as LED elements.

The openings 13 may correspond to the individual LED elements 11 in that the aforesaid either fit into the opening so that they reach at least in part through the LED elements 11, or in that they are essentially only arranged behind so that they are visually active through the opening.

It is also imaginable not to provide any openings 13 in the bi-stable display element 1, but to nevertheless at least locally illuminate said display element 1 from behind, or illuminate through it, by means of the individual further display elements 11. With an essentially transparent embodiment of the control element arrangement 2 and the bi-stable display element 1, the display element 11 may also in this way carry out its function.

Furthermore, openings 13 can also be provided in the control element arrangement 2 or in the respective control elements 3, so that, for example, the further display elements 11 reach not only through the bi-stable display element 1 but also through the control element arrangement 2.

The further display elements 11 may be arranged on the LED element arrangement 12 and in this way or through them may be electrically and/or mechanically connected. A control element (not shown in detail) may drive the further display elements 11 either individually or in groups.

In addition, it should be noted that "comprising" does not exclude other elements or steps, and "a" or "one" does not exclude a plurality Furthermore, it should be noted that features or steps which have been described with reference to one of the above exemplary embodiments, or exemplary embodiments of the present invention, may also be used in combination with other features or steps of other exemplary embodiments or exemplary designs of the present invention. Reference characters in the claims are not to be construed as limitations.

LIST OF REFERENCE NUMERALS

1 Bi-stable display element
2 Control element arrangement
3 Control element
4 Electronics element
5 Interface element/interface
6 Display-control element
7 Control element—controlling element
8 Image-rendering element
10 Illumination element
11 Further display element
12 LED element arrangement
13 Opening
20 Display- and control element panel

The invention claimed is:

1. An aircraft display- and control element panel for controlling cabin functions in an aircraft, comprising:
   a bi-stable display element having at least one sub-region; and
   a control element;
   wherein the bi-stable display element and the control element are arranged so as to overlap one another and be essentially congruent to one another;
   wherein the bi-stable display element is adapted to reproduce information at least in the at least one sub-region;
   wherein an event is triggerable by activating the control element,
   wherein the display element is decouplable from all of a display-control element, an image-rendering element and an energy supply element, all said elements associated with the display element;
   wherein the display- and control element panel is operable in an operating state in the aircraft without all of the display-control element, the image-rendering element and the energy supply element, all said elements associated with the display element; and
   wherein the display element is configured to be programmable inside and outside the aircraft at least to present predetermined information at a predetermined sub-region of the bi-stable display element.

2. The panel of claim 1, wherein the control element is essentially transparent.

3. The panel of claim 1, wherein the bi-stable display element is essentially arranged behind the control element.

4. The panel of claim 1, wherein the control element is essentially arranged behind the bi-stable display element.

5. The panel of claim 1, further comprising a plurality of control elements.

6. The panel of claim 5, wherein each control element is associated with a discrete bi-stable display element.

7. The panel of claim 5, further comprising at least one discrete control element with at least one discrete bi-stable display element as well as at least one touch-sensitive region with at least one bi-stable display element.

8. The panel of claim 1, further comprising a plurality of bi-stable display elements.

9. The panel of claim 1, wherein the control element is selected from the group consisting of a discrete control element, key button, switch, pressure-sensitive region, wherein the position of activation is determinable, and a touchpad.

10. The panel of claim 1, further comprising
   a further display element, associated with at least one bi-stable display element.

11. The panel of claim 10, wherein the further display element is an LED element.

12. The panel of claim 10, further comprising an illumination element for at least partial illumination of a further display element.

13. The panel of claim 1, further comprising an illumination element for at least partial illumination of at least one bi-stable display element.

14. The panel of claim 1, further comprising at least one element from the group consisting of a display-control element, image-rendering element, control element-controlling element and an interface element.

15. An aircraft comprising:
   a display- and control element panel for controlling cabin functions comprising:
      a bi-stable display element having at least one sub-region; and
      a control element;
      wherein the bi-stable display element and the control element are arranged so as to overlap one another and be essentially congruent to one another;
      wherein the bi-stable display element is adapted to reproduce information at least in the at least one sub-region;
      wherein an event is triggerable by activating the control element, wherein the display element is decouplable from all of display-control element, an image-rendering element and an energy supply element, all said elements associated with the display element;

wherein the display- and control element panel is operable in an operating state in the aircraft without all of the display-control element, the image-rendering element and the energy supply element, all said elements associated with the display element; and wherein the display-and control element panel is configured to be programmable inside and outside the aircraft at least to present predetermined information at a predetermined location of the bi-stable display element.

* * * * *